Nov. 1, 1955 G. E. DUNN 2,722,115
UNIVERSAL JOINT
Filed June 21, 1952
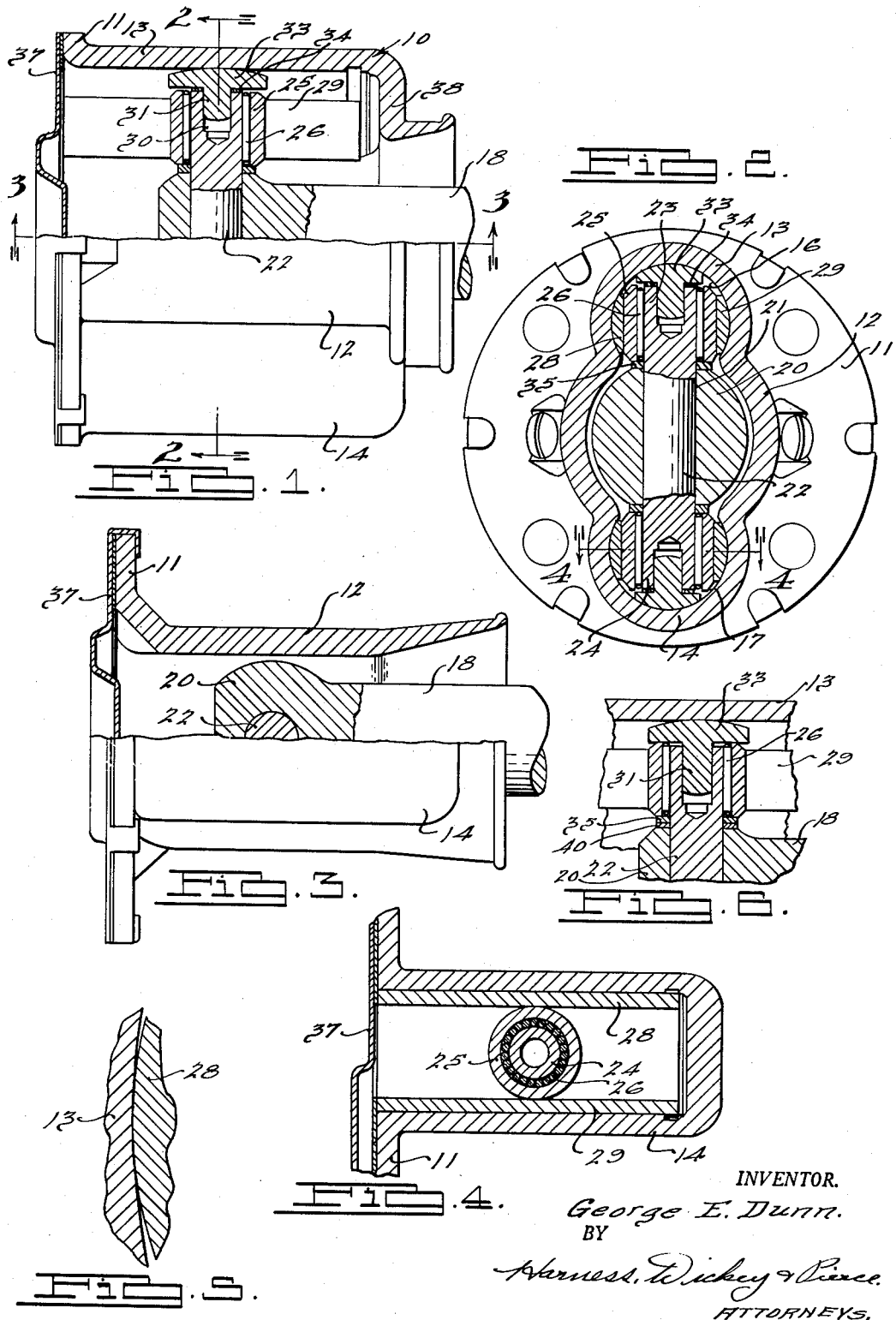
INVENTOR.
George E. Dunn.
BY
Harness, Dickey & Pierce
ATTORNEYS.

United States Patent Office 2,722,115
Patented Nov. 1, 1955

2,722,115

UNIVERSAL JOINT

George E. Dunn, Dearborn, Mich., assignor to Universal Products Company, Incorporated, Dearborn, Mich., a corporation of Delaware Application June 21, 1952, Serial No. 294,783

2 Claims. (Cl. 64—8)

This invention relates to universal joints and more particularly to universal joints employing needle bearings, and this application is a continuation-in-part of the applicant's copending application for improvement in Universal Joint, Serial No. 683,322, filed July 13, 1946, now abandoned.

The type of universal joint to which this invention relates has been used in extremely large quantities on passenger automobiles in the United States for approximately thirty-five years. The earliest form of joint used commercially is of the type shown in Emerson Patent No. 1,297,128, issued March 11, 1919. Subsequently, roller bearings and end thrust buttons were incorporated in universal joints such as shown in Warner Patent No. 1,921,274, issued August 8, 1933. The joint shown in the Warner patent fundamentally comprises a housing having a central opening and diametrically opposed cylindrical guideways. The housing is fastened to one shaft element and a second shaft element projecting into the central opening of the housing has a cross pin extending through its end so as to provide radial trunnions which project respectively into the cylindrical guideways. Within each guideway the trunnion is provided with a spherical roller having contact with the circumferentially opposed sides of the guideway, and between the trunnion and opening in the roller, needle bearings are provided. During operation of a joint of this character, the shaft elements usually run in angular relation and as a result, the cross pin oscillates longitudinally of the guideways and this necessarily requires that the rollers move inwardly and outwardly along the trunnions as they are shifted along the guideways. While the roller elements provide for self alignment of the bearings, their motion axially along the trunnions produces sliding friction in the bearings and it has been found that this is an important factor in reducing the life of the joint.

Many millions of joints constructed in accordance with the Warner patent have been used on passenger automobiles in the United States. The universal joint on a passenger automobile is subject to exceedingly severe operating conditions which critically restrict and complicate the design and construction of the joint. In the first place the joint must be made of a minimum size and weight in order to minimize radial forces incident to unavoidable unbalance which creates a critical so-called "whipping" action of the propeller shaft at high speeds. Propeller shaft whip has always been a serious problem in the design of propeller shafts and universal joints which form parts of the shafts, and its elimination has been achieved to a large extent by reducing the size and weight of the universal joints to the absolute minimum. This has, however, resulted in the use of small bearings which are subject to exceedingly high loads. In the joint shown in the Warner patent, these high bearing loads are aggravated by the fact that the spherical rollers on the trunnions must slide axially on the trunnions when the two shaft sections move angularly with respect to each other. This combination of high load and axial sliding action on the rollers has produced an aggravated wear situation which this invention is designed to eliminate.

It is an object of this invention to provide a universal joint including self-aligning bearings wherein means are provided for substantially eliminating sliding friction between the rollers and needles such as previously has occurred.

It is a still further object of this invention to provide a self-aligning bearing type universal joint in which axial movement of the rollers on the trunnions is eliminated by employing flatsided roller guideways which are themselves movable angularly in the joint housing.

It is a still further object of this invention to provide a universal joint of the aforementioned type to carry larger loads without increasing the size of the elements thereof, than has been heretofore possible in joints of this type.

It is a still further object of this invention to provide a universal joint of the aforementioned type in which excessive wear due to sliding action of the rollers is eliminated without losing the self-aligning characteristics which are necessary in a joint of this type, so as to thereby provide a universal joint having a larger and more efficient life than any heretofore known.

It is a still further object of this invention to provide a universal joint of the aforementioned type which permits the use of the same type of joint body as has been heretofore employed and which can be manufactured and assembled inexpensively.

These and other objects of this invention will become apparent from the following detailed description, taken in conjunction with the accompany drawing, in which:

Figure 1 is a side elevational view partly in cross section illustrating a universal joint constructed according to one form of the invention;

Fig. 2 is a cross-sectional view taken substantially along the line 2—2 of Figure 1;

Fig. 3 is a cross-sectional view taken substantially along the line 3—3 of Figure 1;

Fig. 4 is a cross-sectional view taken substantially along the line 4—4 of Figure 2;

Fig. 5 is an enlarged detail view illustrating an initial fitting relationship which may be preferred between the guideways and bearing races; and Fig. 6 is a cross-sectional view illustrating a modified form of bearing assembly which may be used.

Referring to the figures, the joint comprises a housing 10 having a flange 11 at one end which is adapted to be secured to a similar flange on one of the shafts to be connected by the joint. The housing, as best shown by Figure 2, includes a central hollow portion 12 which is generally cylindrical in shape and diametrically opposed portions 13 and 14 having cylindrical guideways 16 and 17 respectively.

The second shaft element to be connected by the joint is indicated at 18 and it extends into the central housing portion 12 from the end thereof opposite the flange 11. At its inner end the shaft element 18 is generally of ball shape as indicated at 20 and is provided with a cross bore 21. This bore receives a pin 22 which is press fitted in place and opposite ends of the pin project outwardly into the cylindrical guideway so as to provide trunnions 23 and 24. Within each of the guideways the bearing arrangement is the same and accordingly only one arrangement need be described in detail.

Each of the trunnions has a cylindrical roller 25 thereon and between this roller and the trunnion, needle bearings 26 are provided. Between the outer cylindrical surface of the roller and the circumferentially opposite sides of the guideways elongated bearing races 28 and 29 respectively are provided and each of these races has its outer surface curved substantially to fit the guideway surface while its inner surface is flat and in tangential contact with the roller. Consequently, the two flat surfaces of opposing races provide substantially parallel walls between which the roller may roll, slide and swing as the cross pin 22 and shaft element 18 shift relative to the body 10. The bearing races 28 and 29 may slide circumferentially around the walls of the guideways to compensate for the trunnion divergence, as will hereinafter appear. The rollers 25, raceway inserts 28 and 29 and pin 22 are all hardened, as by case hardening processes.

At its outer end, each trunnion has an opening 30 which slidably receives a cylindrical shank 31 on a button 33 which corresponds substantially to the button shown in the previously identified patent. It might be stated, however, that the button is curved longitudinally of the guideway about the center of the ball end 20 of the shaft and is curved transversely of the guideway with the center of curvature located on the axis of the guideway. For taking up slight play or tolerances, a bowed washer 34 is used between the button and trunnion. At the inner end of the needle bearings a wear ring or collar 35 is provided to prevent the needle bearings from engaging the ball 20. Normally the joint is provided with a cover plate 37 as seen in Figures 1 and 2, and this plate prevents removal of the races 28 and 29 while movement of the races in the other direction is limited by an inturned end wall 38 on the housing at the end of each guideway.

It has been stated that the races 28 and 29 substantially fit the curved surfaces of the guideways. However, it seems preferable to use a radius of curvature on the races which is slightly smaller than the radius of curvature of the guideways, as is illustrated in Figure 5. Any difference of radii in this case is small and is designed to compensate for give or resiliency in the wall of the guideway under torque load. In other words, when a load is being imparted through the races, the give or resiliency in the guideway wall tends, as will be readily realized in viewing Figure 5, to bring the surface of the guideway and bearing element into a fully mating fit, so that the races can more properly move circumferentially around the walls of the guideways.

During operation of the joint, the two shaft elements may move axially in a relative sense and during such movement the rollers 25 travel along the guideways between the two races 28 and 29. Any oscillation or angling of one shaft relative to the other takes place through the angling of the cross pin 22 longitudinally of the guideways and this action swings the ends of the trunnions and rollers therewith between the walls of the races. Because of the flat-sided bearing races the rollers are able to move in a curved path, as the joint is viewed in side elevation, incident to the relative annular movements of the connected shaft sections, and this eliminates the axial movement of the rollers on the trunnions. The normal loads to which these trunnions are subject in use necessarily cause some deflection of the outer unsupported ends of the trunnions. This deflection, even though limited to a few tenths of a thousandth of an inch, is enough to cause a heavy concentration of the load at the inner ends of the rollers. Thus, the entire load is not distributed throughout the length of the bearing, but is concentrated in a minor portion of the length and therefore raised to an excessive and destructive value unless the outer bearing or ball may also deflect or change its position to conform to the deflected axis of the trunnion. Therefore, when the trunnion deflects under load, the bearing races may slide circumferentially around the walls of the guideways to compensate for the trunnion deflection and redistribute the load over the major portion of the length of the slender needle rollers 26. This greatly reduces stress concentration and avoids what would otherwise be a rapid destruction of the bearing in use. It will also be appreciated that while excessive wearing of the joint is avoided with this construction, the self-aligning nature of the bearings is not in any way impaired. It follows that the ends of the rollers can be fitted rather closely between the under side of the buttons 33 and the wear rings 35 so as to practically eliminate shifting of the rollers along the trunnions to eliminate sliding friction between the rollers and the needle bearings. This advantage increases the bearing capacity of the joint and consequently a joint previously made larger to secure greater bearing capacity, can be reduced in size while still obtaining the desired bearing capacity. Furthermore, for a given size ball end 20 on the shaft, the cross pin 22 can be reduced in size and this has been found desirable in some instances because it reduces breakage of ball ends under heavy torque loads. With a given size body and shaft element 18, the bearing capacity can, therefore, be increased by using the rollers 25 and races 28 and 29 or the desired bearing capacity can be maintained while still allowing a reduction in the size of the needle bearing, trunnions and rollers.

Figure 6 shows a modified form of the assembly wherein instead of using a bowed washer between the end of each trunnion and the button 33, a similar washer 40 is placed between each thrust collar 35 and the ball head 20. This washer takes up any slight looseness such as might occur due to tolerances. Marginal portions of the button 33 are in contact with the end wall of the roller 25 and it will be noted that the under wall of the button does not contact the end surface of the trunnion. In the construction shown by Figure 2, the shaft 18 and ball head 20 are centered through engagement of the buttons with the end faces of the trunnions, whereas in the modified form shown in Figure 6, the centering is effected through engagement of the buttons with the rollers 25 and engagement of the rollers with the thrust washers 35 on the ball head. This arrangement may be particularly desirable in connection with replacements of the cross pin, as in that case it would not be absolutely essential that the cross pin be precisely located so as to have the trunnions exactly equal in length. Repairmen in replacing cross pins are apt to not be too concerned with this factor and then when the parts are assembled, the ball head might not be centered if the trunnions are used for centering. According to the assembly in Figure 6, the centering would still be effected properly since it would be effected independently of the trunnions.

While certain important advantages of the invention have been mentioned previously, it also should be appreciated that by using the bearing races 28 and 29, it is not necessary that the walls of cylindrical guideways 16 and 17 be extremely hard as has been required heretofore, since now there is no line contact between a spherical roller and the guideway as previously existed. Instead, the line contact is between the hardened bearing races 28 and 29 and the cylindrical rollers. This permits making the housing 10 more efficiently and at reduced cost because case hardening of the guideways may be avoided.

Although not more than one form of the invention has been illustrated and described in detail, it will be apparent to those skilled in the art that various modifications may be made without departing from the scope of the claims.

What is claimed is:

1. A universal joint, comprising a body having a central opening and cylindrical guideways extending longitudinally of the joint axis and which are located radially outwardly of the central opening, a shaft element projecting into the central opening and having radial trunnions respectively projecting into the guideways, a cylindrical roller in each guideway and having a bore receiving the trunnion, needle bearings in the bore and around the trunnion, elongated bearing elements disposed respectively between opposite sides of each guideway and the roller therein, each of said bearing elements being of substantially the full length of the guideway the outer surface of each bearing being curved complementally to and substantially fitting the side wall surface of the guideway so as to be slidable circumferentially of the guideway, each bearing element having an inner flat surface along which the roller can roll and slide without requiring shifting of the roller axially along its trunnion, means for limiting endwise movement of said elements in both directions, and means including the outer walls of the guideways for preventing axial movement of the roller with respect to the trunnion.

2. A universal joint, comprising a body having a central opening on the joint axis and cylindrical guideways extending parallel to the axis of the joint and located on opposite sides of the central opening, a shaft element projecting into the central opening and having radial trunnions projecting respectively into the guideways, a bearing element in each guideway having an outer cylindrical wall adapted to fit the cylindrical wall of the guideway and having a flat inner surface lying in a plane parallel to the trunnions, said bearing elements being of substantially the full length of the guideways, means for limiting endwise movement of the bearing elements while leaving them free to move about the axis of the guideways and in contact with the walls of the guideways, the width of said flat surfaces on the bearing elements being substantially uniform from end to end, and a bearing member journaled on each trunnion and having an outer surface in bearing engagement with the bearing element in each guideway whereby on endwise movement of said shaft element relative to said body said bearing members move along the flat surfaces of the bearing elements.

References Cited in the file of this patent

UNITED STATES PATENTS

| | | |
|---|---|---|
| 1,297,128 | Emerson | Mar. 11, 1919 |
| 1,921,274 | Warner | Aug. 8, 1933 |
| 2,194,798 | Koppel | Mar. 26, 1940 |

FOREIGN PATENTS

| | | |
|---|---|---|
| 18,938 | Great Britain | 1913 |